United States Patent Office 2,757,539
Patented Aug. 7, 1956

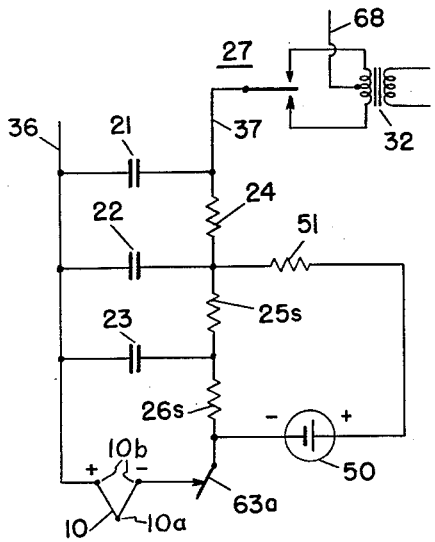
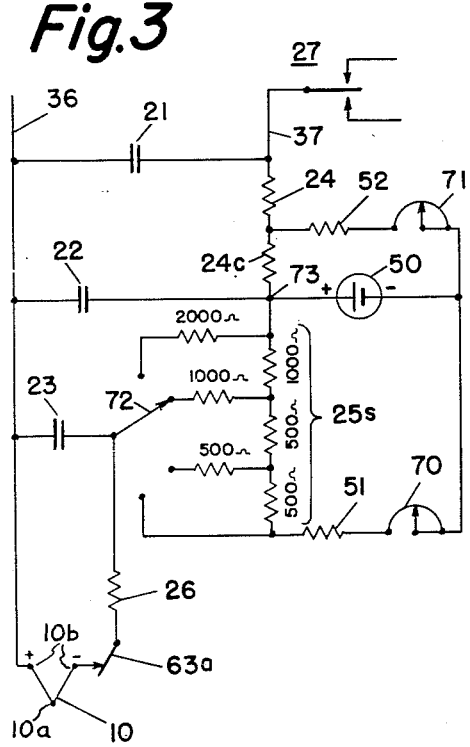
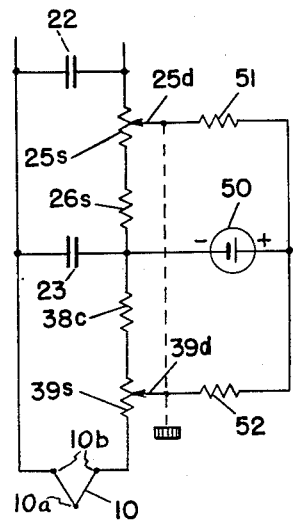

2,757,539

COMPENSATING AND RANGE-SUPPRESSION SYSTEMS

George L. Broomell, Jr., Lower Gwynedd Township, Montgomery County, Pa., assignor to Leeds and Northrup Company, Philadelphia, Pa., a corporation of Pennsylvania Application August 1, 1952, Serial No. 302,093

9 Claims. (Cl. 73—361)

This invention relates to electrical measuring systems of the null type in which a voltage or potential difference derived from a potentiometer opposes that developed by a device responsive to change in the magnitude of a condition.

In potentiometric measuring circuits it is frequently desirable to measure with considerable accuracy a change through a very narrow range of the magnitude of a condition. For example, the important consideration in a heat-treating process may be the temperature changes within the range of from 950° to 1000°. Such measuring problems present a number of difficulties.

In carrying out the present invention in one form thereof, provision is made for the development in the input circuit of potential differences, one of which provides range-suppression and the other of which provides compensation for cold junction temperature changes. In the preferred form of the invention, both potential differences are derived from a standard cell whose voltage is invariable. In a further preferred form of the invention, the resistors for introducing the foregoing potentials, one or both of them, form component parts of a filter network, and in a further embodiment of the invention the same standard cell is utilized in a standardizing circuit for the adjustment of a rheostat connected in series with the potentiometer battery to compensate for changes in its voltage.

For further objects and advantages of the invention and for a detailed disclosure thereof, reference is to be had to the following description taken in conjunction with the accompanying drawings, in which:

Fig. 2 to 4 are fractional diagrams of modified systems applicable to Fig. 1, illustrating further modifications of the invention.

Figure 1:
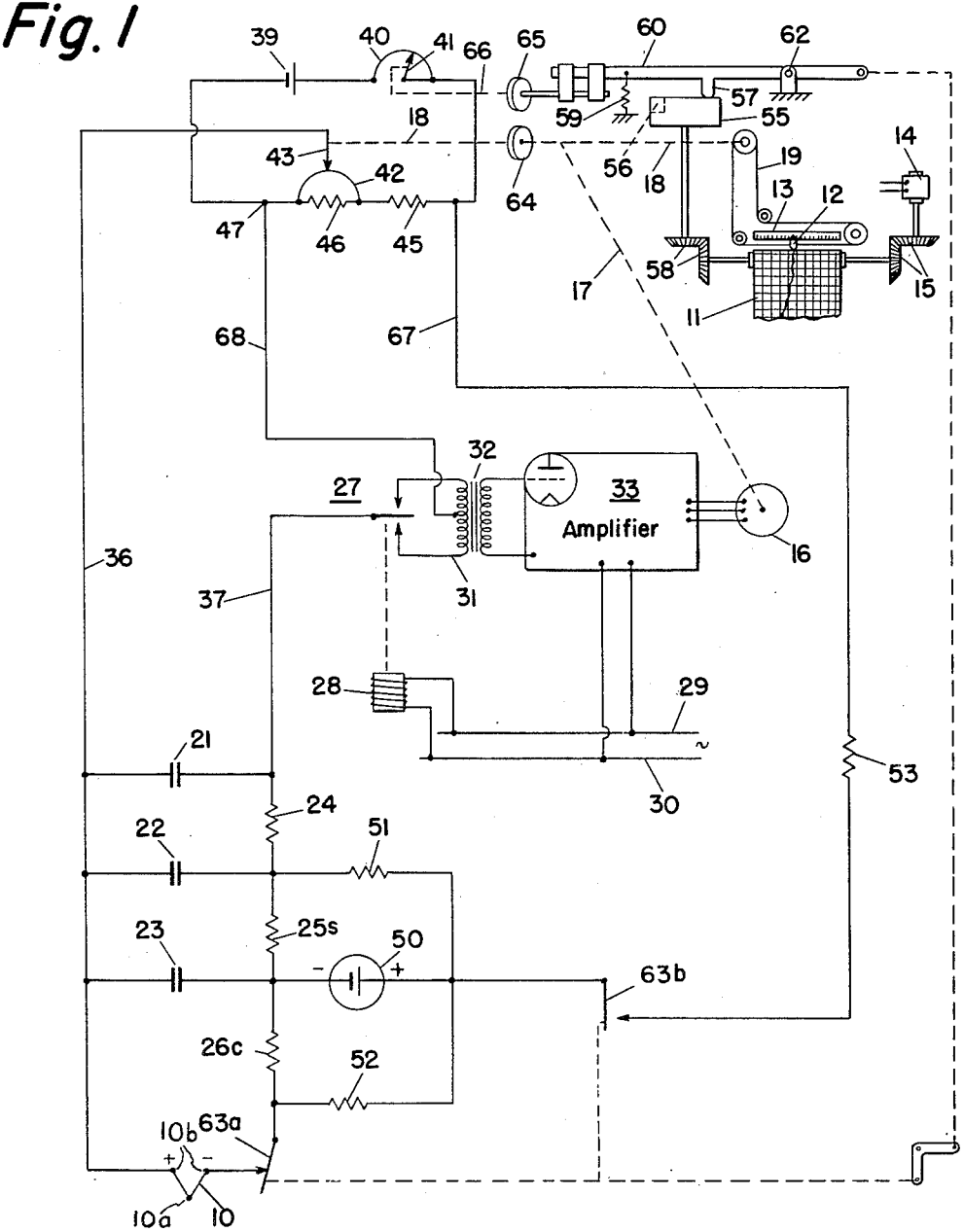
Fig. 1 is a wiring diagram schematically illustrating one embodiment of the invention.

Referring to Fig. 1, the invention in one form has been shown applied to a system of the general type disclosed in copending application, Serial No. 725,466, filed January 31, 1947, by Albert J. Williams, Jr., now U. S. Patent No. 2,657,349. The condition under measurement, generally known as the measured variable, may be temperature in which case the responsive device may include one or more thermocouples, only one, the thermocouple 10, being shown. That thermocouple has a hot or measuring junction 10a and a cold junction 10b. The temperature to which the hot or measuring junction 10a of the thermocouple is subjected may be recorded on a chart 11 by means of a pen 12, having an index associated with a scale 13. The strip chart 11 is driven by means of a constant speed motor 14 through suitable reduction gearing 15. The pen and associated index 12 are driven by means of a motor 16, the mechanical connection therefrom being indicated by the broken lines 17 and 18 and a cable or cord 19. The motor 16 and the associated system provide a continuously operable high speed measuring system generally of the type disclosed in detail in Fig. 4 of Williams Patent No. 2,113,164. While in Fig. 4 of that patent there is disclosed a tachometer or small generator for the introduction of a damping action, in the present invention, Fig. 1, the damping is provided by means of capacitors 21—23 and resistors 24, 25s and 26c which also form a filtering network having values designed to attenuate stray-field alternating current which would otherwise be applied to a converter 27 and to the input transformer 32 of an alternating-current amplifier 33. In particular, there is attenuated alternating current within the frequency range supplied from lines 29 and 30 to the operating coil 28 of converter 27 and to the amplifier 33. The need for filtering against alternating current due to stray fields has long been recognized. Such stray fields are frequently present with location of the measuring system near other electrical equipment and sometimes arise from alternating current supplied to motor 16 and to converter 27.

A battery 39 supplies the potentiometer which includes the current-adjusting rheostat 40 with movable contact 41, a slidewire 42 with movable contact 43, and a shunting resistor 46 as well as series resistor 45.

It will be observed that there is derived from the potentiometer a direct current potential difference between contact 43 and a point 47 which, in the series-circuit including thermocouple 10 and resistors 24, 25s and 26c, opposes the direct current potential difference developed by the thermocouple. At balance no current flows in the series-circuit. When the temperature of thermocouple 10 changes, the potential difference produced by it changes, and the difference-voltage is applied to a detector comprising converter 27 and an amplifier 33. The unidirectional unbalance or difference voltage is by converter 27 converted to alternating current which through amplifier 33 energizes motor 16 to adjust contact 43 in a direction to reduce the difference. By providing the amplifier 33 with high gain, adequate sensitivity is provided for measurements of the required precision.

In accordance with the present invention, range-suppression is provided by a standard cell 50, the filter resistor 25s and a resisotr 51 included in circuit with the filter resistor 25s and the standard cell. With a polarity of the thermocouple as indicated, it will be observed the potential difference developed by the filter resistor 25s in the series-circuit opposes the potential developed by thermocouple 10. Resistor 25s, preferably of manganin, will have a value to provide the desired filtering action while the resistor 51 will have a resistance value to maintain high the resistance of the local branch of the circuit to limit the current drawn from the standard cell 50 to a conservative operating value and to predetermine the extent of range-suppression. By developing across filter resistor 25s a potential difference opposing that of thermocouple 10 and aiding the potential difference developed between contact 43 and point 47, it will be seen that the latter potential difference in order to establish zero potential difference at converter 27 will be smaller by the amount of the potential difference introduced by filter resistor 25s.

It will be observed the standard cell 50 is also connected in a local branch circuit including filter resistor 26c and a series resistor 52. The polarity of the potential difference developed in the series-circuit by filter resistor 26c is opposite that introduced by resistor 25s. The magnitude of the potential difference introduced by filter resistor 26c is determined by the value of resistor 52 which is selected with reference to the variation in the output of the thermocouple 10 with change in temperature of its cold junction. For a platinum, platinum-10% rhodium thermocouple 10, the filter resistor 26c may comprise a nickel conductor having a resistance of the order of 1747 ohms at 0° F. and 2339 ohms at 95°

F. With such a filter resistor 26c the series resistor 52 will have a value of the order of 200,000 ohms.

Accordingly, while filter resistor 25s provides the desired range-suppression, the filter resistor 26c provides compensation for change in the temperature of the reference or cold junction by introducing a potential difference which aids or increases that developed by thermocouple 10 by an amount which corresponds for the loss of thermocouple output due to a rising temperature of its cold junction 10b and which likewise diminishes with decrease in temperature of its cold junction. The reference or "cold" junction 10b of thermocouple 10 and resistor 26c are disposed at the same location and to the same ambient temperature. The resistor 25s also introduces a potential difference, a part of which compensates or equal that due to current flow in resistor 26c with the temperature thereof at a selected reference level, such as zero degrees F.

In some applications the series-circuit, including the battery 39, may be suitably proportioned to present to that battery a sufficiently high resistance for flow of current within the permissible range for standard cells. For such applications the battery 39 may comprise a standard cell in which case the rheostat 40 may be a fixed resistor, or combined with resistor 45. It will then be unnecessary periodically to standardize the potentiometer circuit. With a battery 39 subject to gradual deterioration of voltage due to continued use, periodic standardization is required.

In accordance with the present invention, the standard cell 50 is not only used for range-suppression and ambient temperature compensation but also for the standardization of the potentiometer. Thus, at periodic intervals as determined by the speed of rotation of a cam 55 having a narrow, deep recess 56, the standardizing operation may be initiated by the registration of recess 56 with cam follower 57. The cam follower forms a part of a lever 60 pivoted at 62 and serves to operate standardizing switches 63a and 63b from their illustrated left-hand positions to their right-hand positions. The counterclockwise rotation of lever 60 under influence of the spring 59, and by gravity, brings into engagement driving disc 64 and driven disc 65 for adjustment through mechanical connection 66 of rheostat contact 41.

It will be observed that with contacts 63a and 63b of the standardizing switch in their right-hand positions the thermocouple 10 is disconnected from the series-measuring circuit and the standard cell 50 is connected through resistor 53 and by conductor 67 to the right-hand side of resistor 45. Thus, the converter 27 is then connected in a series-circuit in which the potential at balance between conductors 67 and 68 developed by slidewire 42, its shunting resistor 46 and resistor 45 is opposed by the potential difference developed by the standard cell 50 across resistor 51 and between conductors 37 and 67.

It will be observed that while the standard cell 50 during the standardizing operation is not disconnected from the branch circuits including resistors 25s and 26c, nevertheless the potential difference across the compensating resistor 26c is excluded from the standardizing circuit.

While the system of Fig. 1 has been described with two branches for the standard cell 50, it is to be understood, of course, that the branch formed in part by resistor 52 may be omitted, thus leaving only the range or scale-suppression branch effective.

As shown in Fig. 2, more than a single filter resistor may be utilized for range-suppression, for example, as by connecting the standard cell 50 and series resistor 51 in series with both filter resistors 25s and 26s, it being understood that resistor 26s will be of manganin and not temperature-sensitive like resistor 26c of Fig. 1. In the same manner, more than a single temperature-sensitive filter resistor may be utilized for ambient temperature compensation.

In the foregoing description the resistor 25s of Fig. 1 and the resistors 25s and 26s of Fig. 2 provide range-suppression for the thermocouple outputs varying over a preselected range of temperature and at any desired absolute temperature where that absolute temperature maintains the hot or measuring junction of the thermocouple 10 above that of the reference or measuring junction. For example, as the temperature of the hot junction rises relative to that of the cold junction the output of the thermocouple increases. At 1000° the output will be of a materially different order than at 500°. Thus, for range-suppression, which for convenience is referred to as positive range-suppression, the potential difference developed in the measuring circuit by the range-suppressing resistors 25s of Fig. 1 (25s and 26s of Fig. 2) must develop a correspondingly greater potential difference for the higher temperature than for the lower temperature at polarities in each case opposing that developed by the thermocouple. The end result as far as the measuring circuit is concerned is to present a difference-voltage to the detector or converter 27 within the range of slidewire 42. Thus, if the sensitivity is to be of a full-scale deflection upon a change in temperature of 50°, there will be range-suppression to reduce the output voltage of thermocouple 10 as appearing between conductors 36 and 37 to a value whose magnitude over the 50°-range will correspond to full scale-relative adjustment between slidewire 42 and its contact 43.

In some applications a rising temperature of the measuring junction will result in decreased output of the thermocouple 10. This will occur when the temperature of the measuring junction is lower than that of the reference junction. The lower the temperature of the measuring junction with respect to the reference junction the greater will be the output voltage and as the temperature of the measuring junction rises the voltage output of the thermocouple will decrease. Thus, under the aforesaid conditions the action of resistors 25s, Fig. 1 (25s and 26s, Fig. 2) should be in the aiding direction. Their function may be readily reversed by reversing the polarity of the standard cell 50. The compensation then produced will for convenience be referred to as negative range-suppression.

The fractional wiring diagram of Fig. 4 is also applicable to a system such as shown in Fig. 1, it being understood, of course, that the filter shown as including capacitors 22 and 23 may be of the single-section type (only a single capacity) or may be of any sections more than the three shown in Fig. 1.

In Fig. 4 the filtering resistance is made up of resistors 25s and 26s while a second filtering resistance is made up of resistors 38c and 39s. The remainder of the circuit of Fig. 4 is like that of Fig. 1 except that relative adjustment is provided as between a contact 25d and resistor 25s and a contact 39d and resistor 39s. With the parts in the illustrated positions it will be seen that resistor 38c provides for compensation for changes in temperature of the reference junction of thermocouple 10. With the reference junction at a reference level, such as 0° F., no compensation will be required and, accordingly, the compensating resistor 38c should not introduce a potential in the measuring circuit. It is obvious that it does for the reason that current then flows through it from standard cell 50. The effect of that current flow, however, is removed by the provision of resistor 26s, the product of the current and its resistance value producing a potential difference equal and opposite to that developed across compensating resistor 38c at the reference level of, say, 0° F. For any temperature of resistor 38c and of the reference junction of thermocouple 10 other than the reference temperature, either above or below, resistor 38c will introduce the compensating potential difference needed for precision of measurement.

With resistors 51 and 52 of equal value and resistors 25s and 39s equal to each other, then when contacts 25d and 39d occupy positions midway of their respective resistors the potential difference introduced by the lower half of resistor 25s will be equal and opposite to that introduced by the upper half of resistor 39s. Thus, there will not be range-suppression, either positive or negative. However, if the position of contact 25d is moved nearer the upper end of resistor 25s, 39d being moved upwardly with it, the potential difference developed by the increasing resistance of resistor 25s will introduce positive range-suppression. Conversely, as contacts 25d and 39d are moved downwardly from their illustrated mid-positions the decreasing resistance of resistor 25s and the increasing resistance of resistor 39s will introduce negative range-suppression. Thus, in accordance with the system of Fig. 4 any desired degree of positive or negative range-suppression may be provided, either by continuous relative adjustment between resistor 25s and its contact 25d and simultaneous adjustment between resistor 39s and contact 39d, or tap-connections may be used either with or without compensating resistors such as shown in Fig. 3.

The resistors 51 and 52 as indicated above are quite high, of the order of 200,000 ohms relative to resistors 25s and 39s which may be of the order of something over 1,000 ohms.

With the principles of the invention now understood, it will be apparent that many other modifications may be made within the scope of the appended claims. For example, as shown in Fig. 3 there may be included adjustable resistors in the several local branches, such as resistors 70 and 71. The compensating resistor may form a fractional part of a filtering resistor. One part, 24c will be temperature-responsive while the other part 24 is made of manganin. Only the part 24c is connected in a branch including standard cell 50. The range-suppressing filter resistor 25s may be tapped. If desired, each tap connection may include a resistor of such size that regardless of the position of an adjustable contact 72 there will always be approximately the same value of filtering resistance between that contact and the point 73. The resistance values shown are illustrative, it being understood that many taps may be provided and other resistance values used as may be desired.

By applying the range-suppression feature with or without the measuring junction compensator circuit to the resistors in the series-measuring circuit, it will be seen that all components associated therewith may be remotely located with respect to the slidewire 42 adjusted by motor 16. Thus, as shown in Fig. 1 the filter as a whole, including the branch circuits powered by standard cell 50, may be maintained in a metallic enclosure which may provide electrical shielding and which also may be maintained at a predetermined temperature for some applications.

Another advantage, particularly as shown in Fig. 3, is the location of the range-selecting means shown as switch 72 ahead of one or more sections of the filter. Thus, any alternating current which may appear in the measuring circuit by reason of the presence of the selector switch 72 will be greatly attenuated by the filter sections and substantially eliminated as far as the detector 27 and amplifier 33 are concerned.

Those skilled in the art understand how to select the needed sizes of circuit components to meet different conditions. However, in the modification of Fig. 3, and for the above-mentioned platinum, platinum-10% rhodium thermocouple 10, the compensating resistor 24c may have a resistance value of about 252.9 ohms at 122° F. and 193.1 ohms at 0° F. The resistor 51 may be of the order of 100,000 ohms and resistor 70, 200 ohms maximum while resistor 24 may have a value of 1747.1 ohms, resistor 52, 203,000 ohms, resistor 71, 400 ohms, and capacitors 21—23 a value of 8 microfarads.

For iron-constantan thermocouples the compensating resistor 26c of Fig. 1 may have a value of 1882.2 ohms at 0° F. and 2430.2 ohms at 95° F.

When a standard cell is used as the source 39 in Fig. 1, the resistor 40 may have a value of the order of 80,000 ohms while the slidewire may be shunted by resistor 46 of 400 ohms with a series resistor 45 of the order of 600 ohms. By increasing the value of resistor 45, the range of measurement is reduced. Full scale span may be set to any desired value, such as five millivolts or one millivolt or any other selected value. With accuracy of measurement thus established, close control of temperature may be attained, to within a fraction of a degree regardless of whether it be at 200° F., at 1000° F. or 2000° F. Standard cells of any of the usual types may be used provided the current flow be limited to their safe working range, for example, two microamperes. With a standard cell of the heavy-duty type, currents of from 15 to 20 microamperes fall within the reliable, normal working range.

In each form of the invention it will be seen that the compensating resistor, such as 26c in Fig. 1, has a temperature coefficient of resistance which results in a variation in the resistance in the right direction and by the right amount to compensate for the variable output of thermocouple 10 due to change in the temperature of its reference junction. The change in resistance of resistor 26c in series-circuit including resistor 52 varies the product of its resistance multiplied by the current flowing through it and in this way changes the potential difference introduced into the series-measuring circuit.

It is to be understood that if resistor 52 be provided with a temperature coefficient of resistance opposite to the one provided for resistor 26c, the current change in resistor 26c (which would then be of manganin) would be in the same direction and would likewise change the potential difference in the measuring circuit to compensate for change of the temperature of the reference junction of thermocouple 10.

What is claimed is:

1. A measuring system comprising a measuring circuit having therein a device for producing a first direct current potential difference of magnitude varying with change in magnitude of a measured variable, adjustable means included in said circuit for producing an adjustable second direct current potential difference opposing said first potential difference, a detector connected to said circuit responsive to potential unbalance between said first and said second potential differences, said detector including a converter for converting said potential unbalance to alternating current, means operable by said alternating current for adjusting said adjustable means to produce a potential balance at said detector, a plurality of filter resistors in series in said circuit between said detector and said device, filter condensers connected to said resistors and across said circuit to form with said resistors an electrical filter, said resistors and said condensers having values which impart to said filter attenuation characteristics for a frequency range including the frequency of said alternating current, a second circuit including at least one of said filter resistors, and means including a voltage source for development by said last-named filter resistor in said measuring circuit of a potential difference in aiding relation with one of said first and said second potential differences for modifying the relative magnitudes required of them for production of a potential balance at said detector.

2. A measuring system comprising a measuring circuit having therein a device for producing a first direct current potential difference of magnitude varying with change in magnitude of a measured variable, adjustable means included in said circuit for producing an adjustable second direct current potential difference opposing said first potential difference, a detector connected to said circuit responsive to potential unbalance between said first potential difference and said second potential difference, said detector including a converter for converting said potential unbalance to alternating current, means operable by said alternating current for adjusting said adjustable means to produce a potential balance at said detector, a plurality of filter resistors in series in said circuit between said detector and said device, filter condensers connected to said resistors and across said circuit to form with said resistors an electrical filter, said resistors and said condensers having values which impart to said filter attenuation characteristics for a frequency range including the frequency of said alternating current, a second circuit including at least one of said filter resistors, and means including a voltage source for development by said last-named filter resistor in said measuring circuit of a potential difference in opposing relation to said first potential difference for modifying the relative magnitudes required between said first and said second potential differences for production of a potential balance at said detector.

3. A measuring system comprising a measuring circuit having therein a device for producing a first direct current potential difference of magnitude varying with change in magnitude of a measured variable, adjustable means included in said circuit for producing an adjustable second direct current potential difference opposing said first potential difference, a detector connected to said circuit responsive to a potential unbalance between said first potential difference and said second potential difference, said detector including a converter for converting said potential unbalance to alternating current, means operable by said alternating current for adjusting said adjustable means to produce a potential balance at said detector, a plurality of filter resistors in series in said circuit between said detector and said device, filter condensers connected to said resistors and across said circuit to form with said resistors an electrical filter, said resistors and said condensers having values which impart to said filter attenuation characteristics for a frequency range including the frequency of said alternating current, a second circuit including at least two of said filter resistors, and means including a voltage source for flow of current from said voltage source in opposite directions through at least two of said filter resistors for development in said measuring circuit of potential differences respectively in aiding relation to said first potential difference and in opposing relation to said second potential difference, said filter resistor developing said aiding potential difference having a temperature coefficient of resistance which varies the magnitude of said aiding potential difference to compensate for variations of said first potential difference due solely to ambient temperature changes of said device, said filter resistor developing said opposing potential difference having a negligible temperature coefficient of resistance for maintaining substantially constant with temperature change the potential difference developed thereby.

4. A measuring system comprising a measuring circuit having therein a thermocouple device having a measuring junction and a cold junction for producing a first potential difference of magnitude varying with change in magnitude of a measured variable, adjustable means included in said circuit for producing an adjustable second potential difference opposing said first potential difference, a detector connected to said circuit responsive to potential unbalance between said first potential difference and said second potential difference, said detector including a converter for converting said potential unbalance to alternating current, means operable by said alternating current for adjusting said adjustable means to produce a potential balance at said detector, a plurality of filter resistors in series in said circuit between said detector and said device, filter condensers connected to said resistors and across said circuit to form with said resistors an electrical filter, said resistors and said condensers having values which impart to said filter attenuation characteristics for a frequency range including the frequency of said alternating current, means for compensating for voltage variations of said thermocouple device due to change of temperature of its cold junction comprising a second circuit including at least one of said filter resistors, a voltage source in said second circuit, and means including said voltage source for flow of current from said last-named source through at least one of said filter resistors in a direction for development in said measuring circuit of a potential difference in aiding relation with said first potential difference, said last-named filter resistor having a temperature coefficient of resistance which varies the magnitude of said aiding potential difference with change in ambient temperature in compensation for said potential variations of said thermocouple device due to change of temperature of its cold junction.

5. A measuring system comprising a measuring circuit having therein a thermocouple device having a measuring junction and a cold junction for producing a first potential difference of magnitude varying with change in magnitude of a measured variable, adjustable means included in said circuit for producing an adjustable second potential difference opposing said first potential difference, a detector connected to said circuit responsive to potential unbalance between said first potential difference and said second potential difference, said detector including a converter for converting said potential unbalance to alternating current, means operable by said alternating current for adjusting said adjustable means to produce a potential balance at said detector, a plurality of filter resistors in series in said circuit between said detector and said device, filter condensers connected to said resistors and across said circuit to form with said resistors an electrical filter, said resistors and said condensers having values which impart to said filter attenuation characteristics for a frequency range including the frequency of said alternating current, a second circuit including at least one of said filter resistors, a standard cell in said second circuit, a current-limiting resistor in series with said cell in said second circuit for limiting current flow therefrom to a value within the normal working range of said cell, and means including said standard cell for development by said last-named filter resistor in said measuring circuit of a potential difference in aiding relation with said first potential difference, said last-named filter resistor having a temperature coefficient of resistance which with change in the ambient temperature of said thermocouple device varies the magnitude of said aiding potential difference in compensation for potential variations of said thermocouple device due to change of the temperature of the cold junction thereof.

6. A measuring system comprising a measuring circuit having therein a device for producing a first direct current potential difference of magnitude varying with change in magnitude of a measured variable, adjustable means including a battery and a rheostat in circuit therewith for producing in said measuring circuit an adjustable second direct current potential difference opposing said first potential difference, a detector connected to said circuit responsive to potential unbalance between said first and said second potential differences, said detector including a converter for converting said potential unbalance to alternating current, means operable by said alternating current for adjusting said adjustable means to produce a potential balance at said detector, a plurality of filter resistors in series in said circuit between said detector and said device, filter condensers connected to said resistors and across said circuit to form with said resistors an electrical filter, said resistors and said condensers having values which impart to said filter attenuation characteristics for a frequency range including the frequency of said alternating current, a second circuit including at least one of said filter resistors, a standard cell in said second circuit, a series resistance limiting the current flow from said standard cell to a value within the normal working range of current of said standard cell, means including said standard cell for development by said last-named filter resistor in said measuring circuit of a potential difference in aiding relation with one of said first and said second potential differences for modifying the relative magnitudes required of them for production of a potential balance at said detector, adjustable means for said rheostat, means including a standardizing circuit for adjusting said rheostat to bring to a predetermined level the current flow from said battery, a circuit-making and breaking device for excluding from said standardizing circuit the potential difference developed by said filter resistor and for completing said standardizing circuit with inclusion therein of the voltage of said standard cell in opposition to a potential difference representative of the flow of current from said battery.

7. A measuring system comprising a measuring circuit having therein a device for producing a first direct current potential difference of magnitude varying with change in magnitude of a measured variable, adjustable means included in said circuit for producing an adjustable second direct current potential difference opposing said first potential difference, a detector connected to said circuit responsive to a potential unbalance between said first potential difference and said second potential difference, said detector including a converter for converting said potential unbalance to alternating current, means operable by said alternating current for adjusting said adjustable means to produce a potential balance at said detector, a plurality of filter resistors in series in said circuit between said detector and said device, filter condensers connected to said resistors and across said circuit to form with said resistors an electrical filter, said resistors and said condensers having values which impart to said filter attenuation characteristics for a frequency range including the frequency of said alternating current, one of said resistors having a plurality of tap connections, a second circuit including said last-named tapped filter resistor, a voltage source in said second circuit for development by said tapped filter resistor in said measuring circuit of a potential difference of selected magnitude and in aiding relation to that of one of said potential differences for modifying the relative magnitudes required of said first potential difference and of said second potential difference for production of a potential balance at said detector.

8. A measuring system comprising a measuring circuit having therein a device for producing a first direct current potential difference of magnitude varying with change in magnitude of a measured variable, adjustable means included in said circuit for producing an adjustable second direct current potential difference opposing said first potential difference, a detector connected to said circuit responsive to potential unbalance between said first potential difference and said second potential difference, said detector including a converter for converting said potential unbalance to alternating current, means operable by said alternating current for adjusting said adjustable means to produce a potential balance at said detector, a plurality of filter resistors in series in said circuit between said detector and said device, filter condensers connected to said resistors and across said circuit to form with said resistors an electrical filter, said resistors and said condensers having values which impart to said filter attenuation characteristics for a frequency range including the frequency of said alternating current, one of said filter resistors having a plurality of tap-connections thereto, each tap-connection including a series-resistance, each respectively of value to provide a constant resistance value from any selected tap to one end of said filter resistor, a second circuit including said last-named tapped filter resistor, a voltage source in said second circuit for development in said measuring circuit by said tapped filter resistor of a potential difference in aiding relation to said second potential difference, and means for connecting said device to a selected tap-connection of said tapped filter resistor for selection of the magnitude in said measuring circuit of said potential difference in aiding relation to said second voltage for predetermined reduction of the value required of said second potential difference to establish a potential balance of said detector.

9. A measuring system comprising a measuring circuit having therein a thermocouple device having a measuring junction and a cold junction for producing a first direct current potential difference of magnitude varying with change in magnitude of a measured variable, adjustable means included in said circuit for producing an adjustable second direct current potential difference opposing said first potential difference, a detector connected to said circuit responsive to potential unbalance between said first potential difference and said second potential difference, said detector including a converter for converting said potential unbalance to alternating current, means operable by said alternating current for adjusting said adjustable means to produce a potential balance at said detector, a plurality of filter resistors in series in said circuit between said detector and said device, filter condensers connected to said resistors and across said circuit to form with said resistors an electrical filter, said resistors and said condensers having values which impart to said filter attenuation characteristics for a frequency range including the frequency of said alternating current, a second circuit including at least one of said filter resistors, and means including a voltage source for development by said last-named filter resistor in said measuring circuit of a potential difference in aiding relation with the voltage developed by said thermocouple device, said second circuit including therein a resistor having a temperature coefficient of resistance which varies the potential difference developed by said last-named filter resistor to modify the potential difference introduced into said measuring circuit in compensation for change in potential output of said thermocouple device with change in temperature of the cold junction thereof.

References Cited in the file of this patent

UNITED STATES PATENTS

| | | |
|---|---|---|
| 2,250,712 | Johnson | July 29, 1941 |
| 2,364,923 | Smith | Dec. 12, 1944 |
| 2,378,999 | Gillespie | June 26, 1945 |
| 2,431,281 | Smith | Nov. 18, 1947 |